United States Patent
Morinaga et al.

(10) Patent No.: US 9,153,202 B2
(45) Date of Patent: Oct. 6, 2015

(54) OBJECT DISPLAY DEVICE, OBJECT DISPLAY METHOD, AND OBJECT DISPLAY PROGRAM

(75) Inventors: Yasuo Morinaga, Chiyoda-ku (JP); Manabu Ota, Chiyoda-ku (JP)

(73) Assignee: NTT DOCOMO, INC., Tokyo (JP)

(*) Notice: Subject to any disclaimer, the term of this patent is extended or adjusted under 35 U.S.C. 154(b) by 218 days.

(21) Appl. No.: 13/880,218

(22) PCT Filed: Jun. 15, 2012

(86) PCT No.: PCT/JP2012/065396
§ 371 (c)(1),
(2), (4) Date: Apr. 18, 2013

(87) PCT Pub. No.: WO2013/008584
PCT Pub. Date: Jan. 17, 2013

(65) Prior Publication Data
US 2013/0201201 A1 Aug. 8, 2013

(30) Foreign Application Priority Data
Jul. 14, 2011 (JP) ................. 2011-156024

(51) Int. Cl.
*G09G 5/00* (2006.01)
*G09G 5/02* (2006.01)
*G06T 19/00* (2011.01)
*G06T 11/00* (2006.01)
*G06T 5/00* (2006.01)
*H04N 5/232* (2006.01)

(52) U.S. Cl.
CPC *G09G 5/02* (2013.01); *G06T 5/008* (2013.01); *G06T 11/00* (2013.01); *G06T 19/006* (2013.01); *H04N 5/23206* (2013.01)

(58) Field of Classification Search
CPC .................. G06T 15/60; G06T 19/006
See application file for complete search history.

(56) References Cited

U.S. PATENT DOCUMENTS 8,619,160 B2 * 12/2013 Woo et al. ............. 348/239
2006/0013436 A1 1/2006 Takahashi et al.
(Continued)

FOREIGN PATENT DOCUMENTS

CN 1768354 A 5/2006
JP 2003 287434 10/2003
(Continued)

OTHER PUBLICATIONS

Baba et al., Shadow Removal from a Real Picture, ACM SIGGRAPH 2003 Sketches and Applications, 2003.*
(Continued)

*Primary Examiner* — Charles Tseng
(74) *Attorney, Agent, or Firm* — Oblon, McClelland, Maier & Neustadt, L.L.P.

(57) ABSTRACT

An object display device includes: an image acquisition unit for acquiring an image in real space; a shade computation unit for acquiring shade information indicating an appearance position of a shadow in real space; an image processing unit for correcting the image in real space or an image of a marker stored in advance, so as to eliminate the effects of a shadow, based on the shade information; a marker sensing unit for extracting the marker from the image in real space using the image in real space and the image of the marker at least one of which is corrected; and a display unit for overlaying a virtual object associated with the marker on the image in real space.

7 Claims, 10 Drawing Sheets (56) References Cited

U.S. PATENT DOCUMENTS

| | | | |
|---|---|---|---|
| 2009/0109240 A1* | 4/2009 | Englert et al. | 345/633 |
| 2010/0066750 A1 | 3/2010 | Yu et al. | |
| 2010/0177095 A1* | 7/2010 | Watkins et al. | 345/426 |
| 2010/0232648 A1* | 9/2010 | Nishino | 382/103 |
| 2011/0063295 A1 | 3/2011 | Kuo et al. | |
| 2011/0234631 A1* | 9/2011 | Kim et al. | 345/632 |

FOREIGN PATENT DOCUMENTS

| | | | |
|---|---|---|---|
| JP | 2005 135355 | 5/2005 | |
| JP | 2007 304732 | 11/2007 | |
| JP | 2007 304733 | 11/2007 | |
| WO | WO 2009102116 A2 * | 8/2009 | G06T 17/40 |

OTHER PUBLICATIONS

Japanese Office Action Issued Feb. 25, 2013 in JP Patent Application No. 2011-156024 Filed Jul. 14, 2011 (with English translation).

International Search Report Issued Jul. 31, 2012 in PCT/JP12/65396 Filed Jun. 15, 2012.

International Preliminary Report on Patentability and Written Opinion issued Jan. 23, 2014 in PCT/JP2012/065396 filed Jun. 15, 2012.

Search Report mailed Apr. 20, 2015, in European Patent Application No. 12811924.5.

Kanbara et al, "Real-time estimation of light source environment for photorealistic augmented reality," Pattern Recognition, 2004, ICRP 2004, Proceedings of the 17$^{th}$ International Conference on Cambridge, vol. 2, Aug. 23, 2004, pp. 911-914, SP010724540.

Hirzer, "Marker Detection for Augmented Reality Applications," Technical Report, ICG TR 08/05, Oct. 27, 2008, pp. 1-27, XP055080592.

Haller et al, "A real-time shadow approach for an Augmented Reality application using shadow volumes," Proceedings of the 10$^{th}$ ACM Symposium on Virtual Reality Software and Technology, Oct. 2003, pp. 56-65, XP002530760.

Combined Office action and Search Report issued Jan. 12, 2015 in Chinese Patent Application No. 201280004128.4 (with English translation).

\* cited by examiner

(a)
| LATITUDE | LONGITUDE |
|---|---|
| 35.22 | 139.67 |

(b)
| DATE | DATE |
|---|---|
| Y(DAY)/X(MONTH)/2011(YEAR) | 12:23:56 |

(c)
| ROLL ANGLE | PITCH ANGLE | YAW ANGLE |
|---|---|---|
| 0 DEGREE | 30 DEGREE | 30 DEGREE |

Fig.5

| MARKER ID | MARKER DATA | OBJECT DATA | POSITION INFORMATION |
|---|---|---|---|
| 1 |  |  | |
| 2 |  |  | (XX, YY) |
| 3 | ⋮ | ⋮ | ⋮ |

OBJECT DISPLAY DEVICE, OBJECT DISPLAY METHOD, AND OBJECT DISPLAY PROGRAM

TECHNICAL FIELD

The present invention relates to an object display device, an object display method, and an object display program.

BACKGROUND ART

In recent years, services based on AR (Augmented Reality) technology have been developed and provided. For example, a technique is known in which an object arranged around the location of a mobile terminal is acquired, and the object including a variety of information and images is overlaid and displayed on an image in real space acquired by a camera provided to the mobile terminal. Another technique is also known in which a predetermined marker is detected from an image in real space acquired by a camera in a mobile terminal, and an object associated with the marker is overlaid on the image in real space and displayed on a display. In addition, a device is known which generates an image of a marker with the color, brightness, contrast, resolution, and focus being changed from a registered image of the marker and detects the marker based on the generated image in order to detect markers well from images captured in various conditions (see, for example, Patent Literature 1). In a technique of detecting a marker by performing binarization processing on the captured image in real space, a device is known which attempts to detect a marker with a threshold for binarization being changed when a marker fails to be detected (see, for example, Patent Literature 2).

CITATION LIST

Patent Literature

[Patent Literature 1] Japanese Patent Application Laid-Open Publication No. 2007-304733
[Patent Literature 2] Japanese Patent Application Laid-Open Publication No. 2007-304732

SUMMARY OF INVENTION

Technical Problem

In such services based on AR technology, mobile terminals capture images in real space under various conditions. In the AR technology using a marker, in particular, when an image in real space is captured outdoors, a shadow is created in the image in real space depending on the position of the sun serving as a light source. This shadow partially causes a big change in the image of the marker. Since the mobile terminal detects a marker by searching the image in real space based on the image of the marker held in advance, a change in the image of the marker included in the image in real space makes it difficult to detect the marker. The techniques described in Patent Literatures indicated above adjust the entire marker or the entire image in real space to improve the accuracy of detecting a marker and therefore cannot detect the image of the marker whose color tone is partially changed.

The present invention is made in view of the above-mentioned problem. An object of the present invention is to provide an object display device, an object display method, and an object display program which can detect a marker even when a shadow is created in an image in real space, in AR technology.

Solution to Problem

In order to solve the above-mentioned problem, an object display device according to an aspect of the present invention includes object information storage means for storing virtual object information about a virtual object in association with a marker that is a predetermined sign located in real space, extracts the marker from an image in real space, and overlays and displays a virtual object associated with the extracted marker on the image in real space. The object display device includes image acquisition means for acquiring an image in real space, shade acquisition means for acquiring shade information indicating an appearance position of a shadow in real space at present, image processing means for correcting at least one of the image in real space acquired by the image acquisition means and the marker stored in the object information storage means, based on the shade information acquired by the shade acquisition means, so as to enable extraction of a marker free from effects of a shadow, sensing means for extracting the marker from the image in real space using the image in real space and the marker at least one of which is corrected by the image processing means, and display means for displaying an overlaid image in which an image of the virtual object associated with the marker, detected by the sensing means, in the object information storage means is overlaid on the image in real space.

In order to solve the above-mentioned problem, an object display method according to an aspect of the present invention is performed in an object display device that includes object information storage means for storing virtual object information about a virtual object in association with a marker that is a predetermined sign located in real space, extracts the marker from an image in real space, and overlays and displays a virtual object associated with the extracted marker on the image in real space. The object display method includes an image acquisition step of acquiring an image in real space, a shade acquisition step of acquiring shade information indicating an appearance position of a shadow in real space at present, an image processing step of correcting at least one of the image in real space acquired in the image acquisition step and the marker stored in the object information storage means, based on the shade information acquired in the shade acquisition step, so as to enable extraction of a marker free from effects of a shadow, a sensing step of extracting the marker from the image in real space using the image in real space and the marker at least one of which is corrected in the image processing step, and a display step of displaying an overlaid image in which an image of the virtual object associated with the marker, detected in the sensing step, in the object information storage means is overlaid on the image in real space.

In order to solve the above-mentioned problem, an object display program according to an aspect of the present invention allows functioning as an object display device that includes object information storage means for storing virtual object information about a virtual object in association with a marker that is a predetermined sign located in real space, extracts the marker from an image in real space, and overlays and displays a virtual object associated with the extracted marker on the image in real space. The object display program allows a computer to implement an image acquisition function of acquiring an image in real space, a shade acquisition function of acquiring shade information indicating an appearance position of a shadow in real space at present, an image processing function of correcting at least one of the image in real space acquired by the image acquisition function and the marker stored in the object information storage means, based on the shade information acquired by the shade acquisition function, so as to enable extraction of a marker free from effects of a shadow, a sensing function of extracting the marker from the image in real space using the image in real space and the marker at least one of which is corrected by the image processing function, and a display function of displaying an overlaid image in which an image of the virtual object associated with the marker, detected by the sensing function, in the object information storage means is overlaid on the image in real space.

In the object display device, the object display method, and the object display program according to the foregoing aspect, shade information indicating the appearance position of a shadow in an image in real space is acquired, and the image in real space or an image of a marker stored in advance is corrected based on the acquired shade information so as to eliminate the effects of the shadow. Accordingly, marker detection processing can be performed in a similar manner as in an image in real space in which a shadow is not created. As a result, the marker can be detected from the image in real space in which a shadow is created.

In the object display device according to another aspect, the image processing means may perform correction of removing a color tone component of a shadow from the image in real space acquired by the image acquisition means, based on the shade information acquired by the shade acquisition means. The sensing means may extract the marker from the image in real space that is corrected by the image processing means.

According to the foregoing aspect, a color tone component of a shadow is removed from the appearance position of the shadow in the image in real space, based on the shade information. As a result, the marker can be detected in a similar manner as in marker detection from an image in real space in which a shadow is not created.

In the object display device according to yet another aspect, the image processing means may perform correction of adding a color tone component of a shadow to the marker stored in the object information storage means, in accordance with a location of the marker, based on the shade information acquired by the shade acquisition means. The sensing means may extract the marker corrected by the image processing means from the image in real space acquired by the image acquisition means.

According to this aspect, when a portion covered with a shadow appears in the marker located in real space, the state and position of the shadow is estimated based on the shade information, and a color tone component of a shadow is added to the image of the marker to be referred to in the detection processing based on the estimated state and position of the shadow. Even when a portion covered with a shadow is created in the image in real space, the detection processing is performed based on the marker whose state is estimated. This enables detection of the marker.

In the object display device according to yet another aspect, the shade acquisition means may estimate the shade information based on three-dimensional map information including information representing a three-dimensional shape and position of a structure in real space, and date-and-time information representing the present date and time. According to the foregoing aspect, the appearance position of the shadow at the present point of time can be estimated appropriately.

In the object display device according to yet another aspect, the shade acquisition means may estimate an appearance position of a shadow created by a user of the object display device, based on the position information indicating a location of the object display device and date-and-time information representing the present date and time, and include the estimated position into the shade information.

According to the foregoing aspect, a shadow created by blocking of light from a light source by the user holding the object display device is given into consideration. This improves the accuracy of the shade information.

In the object display device according to yet another aspect, the image processing means may acquire color tone information of an appearance position of a shadow indicated by the shade information, from the image in real space, and perform correction of removing a color tone component of a shadow from a region having the approximately same color tone information as the color tone information in the image in real space.

In this aspect, not only a shadow caused by a structure permanently existing in real space but also a region of a shadow created by, for example, a substance temporarily passing through in real space, and the color tone component of the shadow is removed from this region. This improves the accuracy of detecting a marker.

Advantageous Effects of Invention

According to an aspect of the present invention, in AR technology, a marker can be detected even when a shadow is created in an image in real space.

DESCRIPTION OF EMBODIMENTS

An embodiment of an object display device, an object display method, and an object display program according to the present invention will be described with reference to the figures. It is noted that the same parts are denoted with the same reference signs, if possible, and an overlapping description is omitted.

Figure 1:
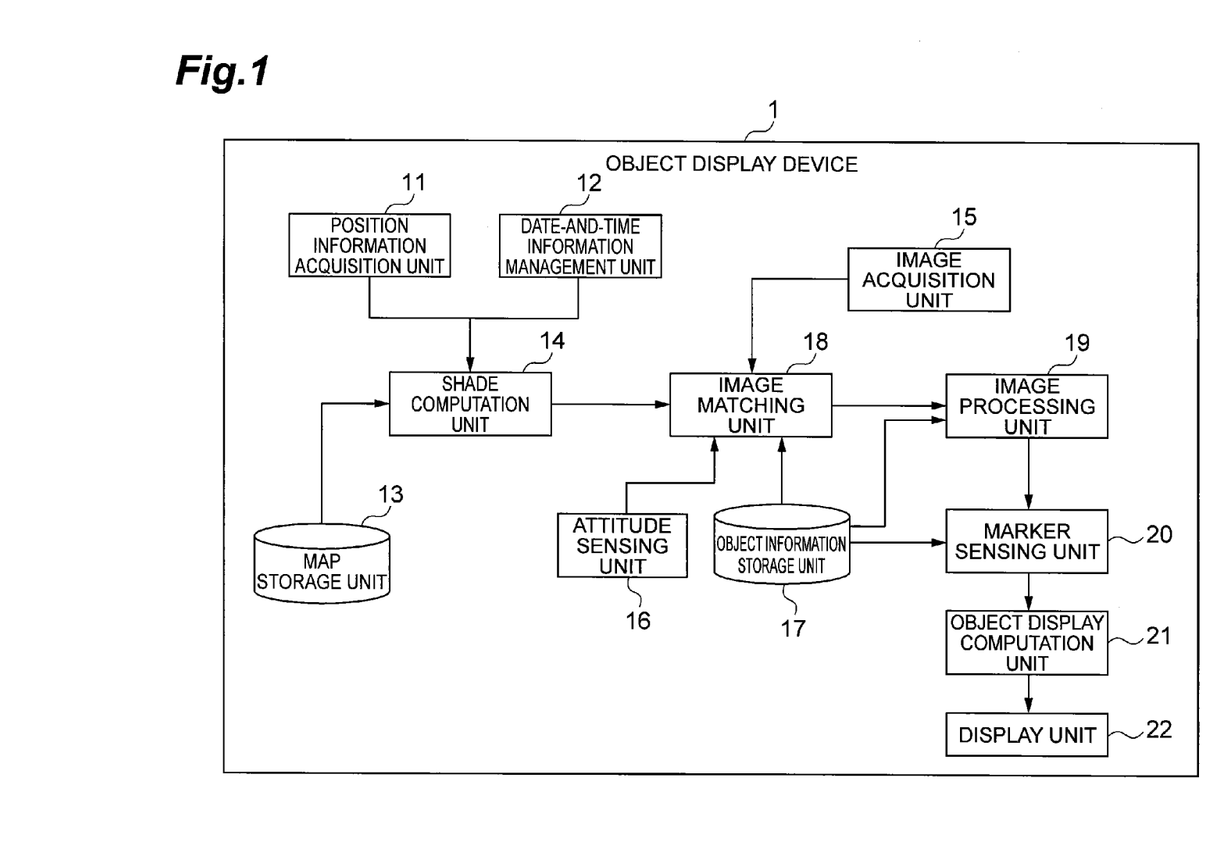
FIG. 1 is a block diagram showing a functional configuration of an object display device.

FIG. 1 is a block diagram showing a functional configuration of an object display device 1. The object display device 1 in the present embodiment is a device that stores virtual object information about a virtual object in association with a marker that is a predetermined sign located in real space, extracts the marker from the image in real space, and overlays and displays the virtual object associated with the extracted marker on the image in real space. The object display device 1 is, for example, a mobile terminal capable of communication via a mobile communication network.

Services based on AR technology using devices such as mobile terminals include the one detecting a predetermined marker from an image in real space acquired by a camera in a mobile terminal and overlaying an object associated with the marker on the image in real space to display the overlaid object on a display. The marker may be a substance artificially provided in real space in advance or may be a structure such as a building or a signboard, or a logo mark existing in real space. Similar services include the one acquiring an object arranged around the location of a mobile terminal based on information of the position where the mobile terminal is located, and overlaying and displaying the object associated with the position in the image in real space acquired by a camera provided to the mobile terminal. A manner of displaying a virtual object using a marker is assumed in the object display device 1 in the present embodiment.

As shown in FIG. 1, the object display device 1 functionally includes a position information acquisition unit 11, a date-and-time information management unit 12, a map storage unit 13, a shade computation unit 14 (shade acquisition means), an image acquisition unit 15 (image acquisition means), an attitude sensing unit 16, an object information storage unit 17 (object storage means), an image matching unit 18, an image processing unit 19 (image processing means), a marker sensing unit 20 (sensing means), an object display computation unit 21, and a display unit 22 (display means).

Figure 2:
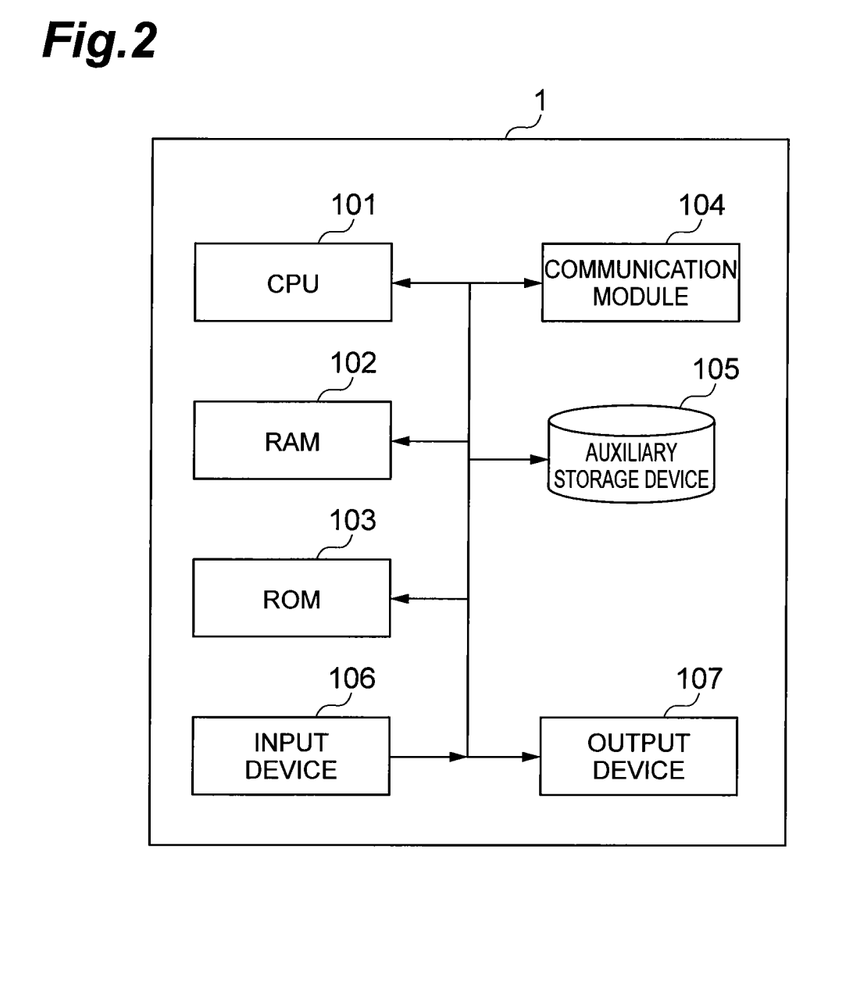
FIG. 2 is a hardware block diagram of the object display device.

FIG. 2 is a hardware configuration diagram of the object display device 1. As shown in FIG. 2, the object display device 1 is physically configured as a computer system mainly including a CPU 101, a RAM 102 and a ROM 103 as main storages, a communication module 104 that is a data transmission/reception device, an auxiliary storage device 105 such as a hard disk or a flash memory, an input device 106 such as a keyboard as an input device, and an output device 107 such as a display. Each function shown in FIG. 1 is implemented by reading predetermined computer software on the hardware such as the CPU 101 and the RAM 102 shown in FIG. 2 to bring the communication module 104, the input device 106, and the output device 107 into operation under the control of the CPU 101, and by reading and writing data from/into the RAM 102 or the auxiliary storage device 105. Referring to FIG. 1 again, each functional unit of the object display device 1 will be described in details.

Figure 3:
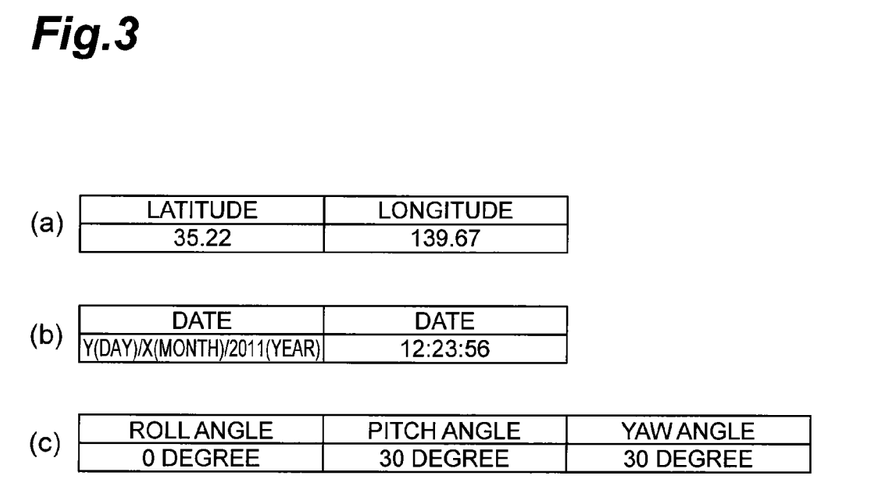
FIG. 3 is a diagram showing an example of position information, date-and-time information, and attitude information.

The position information acquisition unit 11 is a unit that acquires position information indicating the location of the object display device 1 and includes, for example, a global positioning system (GPS) device. FIG. 3(*a*) is diagram showing an example of the position information acquired by the position information acquisition unit 11. As shown in FIG. 3(*a*), the position information acquisition unit 11 acquires, for example, a latitude and a longitude as position information. The position information acquisition unit 11 sends the acquired position information to the shade computation unit 14.

The date-and-time information management unit 12 is a unit that manages date-and-time information indicating the present date and time. The date-and-time information management unit 12 may be, for example, a clock included in the object display device 1. The date-and-time information may be acquired from a not-shown external device through communication. FIG. 3(*b*) is a diagram showing an example of the date-and-time information managed by the date-and-time information management unit 12. As shown in FIG. 3(*b*), the date-and-time information management unit 12 manages, for example, a date and a time as date-and-time information. The date-and-time information management unit 12 sends the date-and-time information to the shade computation unit 14.

The map storage unit 13 is a database that stores three-dimensional map information including information representing the three-dimensional shape and position of a structure in real space. The structure includes artificial structure such as a building and natural geography.

Figure 4:
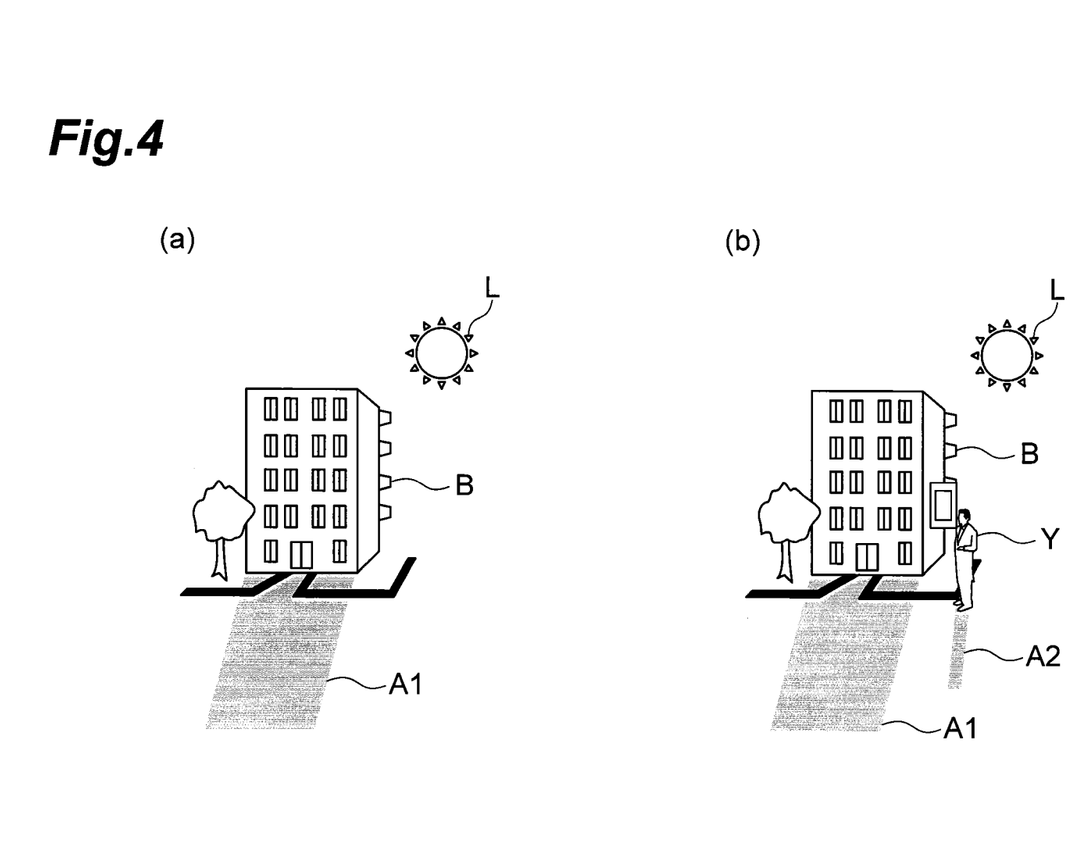
FIG. 4 is a diagram showing an example of shade information estimated by a shade computation unit.

The shade computation unit 14 is a unit that acquires shade information indicating the appearance position of a shadow in real space at present. Specifically, the shade computation unit 14 estimates shade information based on the three-dimensional map information including information representing the three-dimensional shape and position of a structure in real space, and the date-and-time information representing the present date and time. FIG. 4 is a diagram showing an example of the shade information estimated by the shade computation unit 14.

The shade computation unit 14 acquires the map information around the location of the object display device 1 and acquires the position of the sun serving as a light source based on the date-and-time information. The shade computation unit 14 then calculates the appearance position of a shadow created by a structure blocking the sun light. FIG. 4(*a*) is a diagram showing a shadow A1 calculated in this manner. More specifically, the shade computation unit 14 calculates the appearance position of the shadow A1 based on the position of the sun L and the shape of a structure B. The shade computation unit 14 then sends the calculated or acquired shade information to the image matching unit 18.

The shade computation unit 14 may estimate the appearance position of a shadow created by the user of the object display device 1, based on the position information indicating the location of the object display device 1 and the date-and-time information representing the present date and time, and may include the estimated position into the shade information. More specifically, as shown in FIG. 4(*b*), the shade computation unit 14 can calculate the appearance position of a shadow A2 created by a user Y blocking the sun light, based on the position of the sun L and the position of the user Y. The position of the user Y is represented by the position information from the position information acquisition unit 11.

The shade computation unit 14 may be included not in the object display device 1 but in another device capable of communicating with the object display device 1. In this case, the object display device 1 acquires the shade information calculated by another device. The map storage unit 13 and the date-and-time information management unit 12 may also be included in another device capable of communicating with the object display device 1.

The image acquisition unit 15 is a unit that acquires an image in real space and includes, for example, a device such as a camera. The image acquisition unit 15 sends the image in real space to the image matching unit.

The attitude sensing unit 16 is a unit that senses the attitude of the object display device 1 and includes, for example, a device such as an accelerometer sensor and a geomagnetic sensor. FIG. 3(*c*) is a diagram showing an example of attitude information representing the attitude sensed by the attitude sensing unit 16. As shown in FIG. 3(*c*), the attitude sensing unit 16 senses, for example, information such as a roll angle, a pitch angle, and a yaw angle as attitude information. The attitude sensing unit 16 sends the attitude information to the image matching unit 18.

Figure 5:
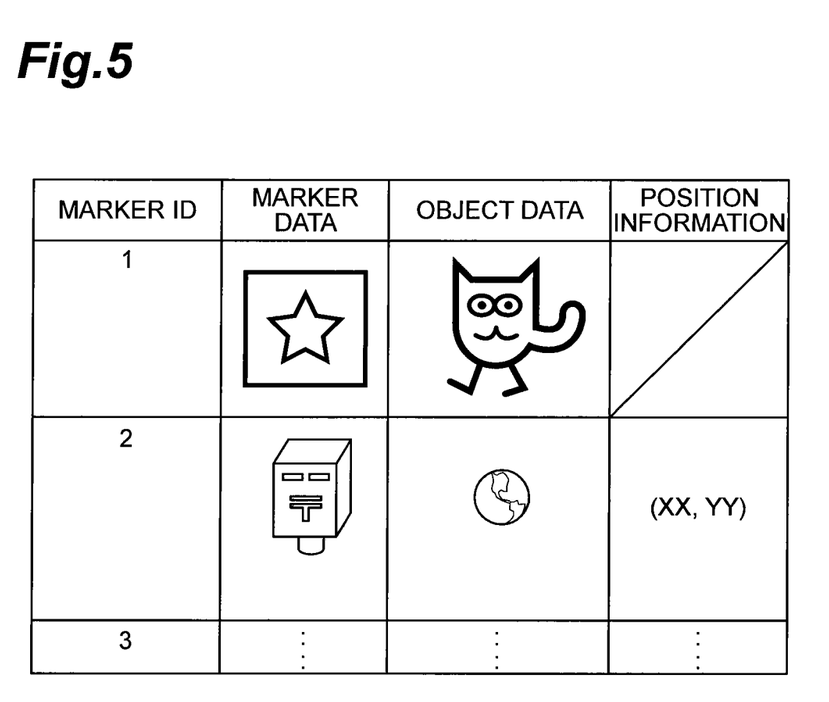
FIG. 5 is a diagram showing a configuration of an object information storage unit and an example of data stored therein.

The object information storage unit 17 is a database that stores data about a virtual object. FIG. 5 is a diagram showing a configuration of the object information storage unit 17 and an example of data stored therein. As shown in FIG. 5, the object information storage unit 17 stores marker data and object data that are associated with a marker ID for identifying a marker. In a case where a substance of which position can be specified in advance, for example, such as a building or a logo mark existing in real space is set as a marker, the object information storage unit 17 can further have position information indicating the location of the marker. The marker data is image data of the marker and is used to extract the marker from the image in real space. The object data is image data of the object overlaid and displayed on the image in real space in association with the marker.

The image matching unit 18 is a unit that matches the image in real space acquired by the image acquisition unit 15 with an estimated image based on the map information and the shade information. The image matching unit 18 generates an estimated image as follows: the image in real space to be acquired by the image acquisition unit 15 is estimated based on the three-dimensional map information, the position information of the object display device 1, and the attitude information acquired by the attitude sensing unit; and then a shadow based on the shade information is added to this image. The image matching unit 18 then determines whether the estimated image and the image in real space match in the position and shape of, for example, a building (structure). The image matching unit 18 can determine a portion in which a shadow appears in the image in real space, by matching the image in real space acquired by the image acquisition unit 15 with the estimated image. The image matching unit 18 can also acquire information about the color tone of a shadow by extracting the color tone component of a portion in which a shadow appears in the image in real space. The image matching unit 18 sends the image in real space from the image acquisition unit 15 as well as the information about the appearance position of the shadow in the image and the information about the color tone of the shadow to the image processing unit 19.

Figure 6:
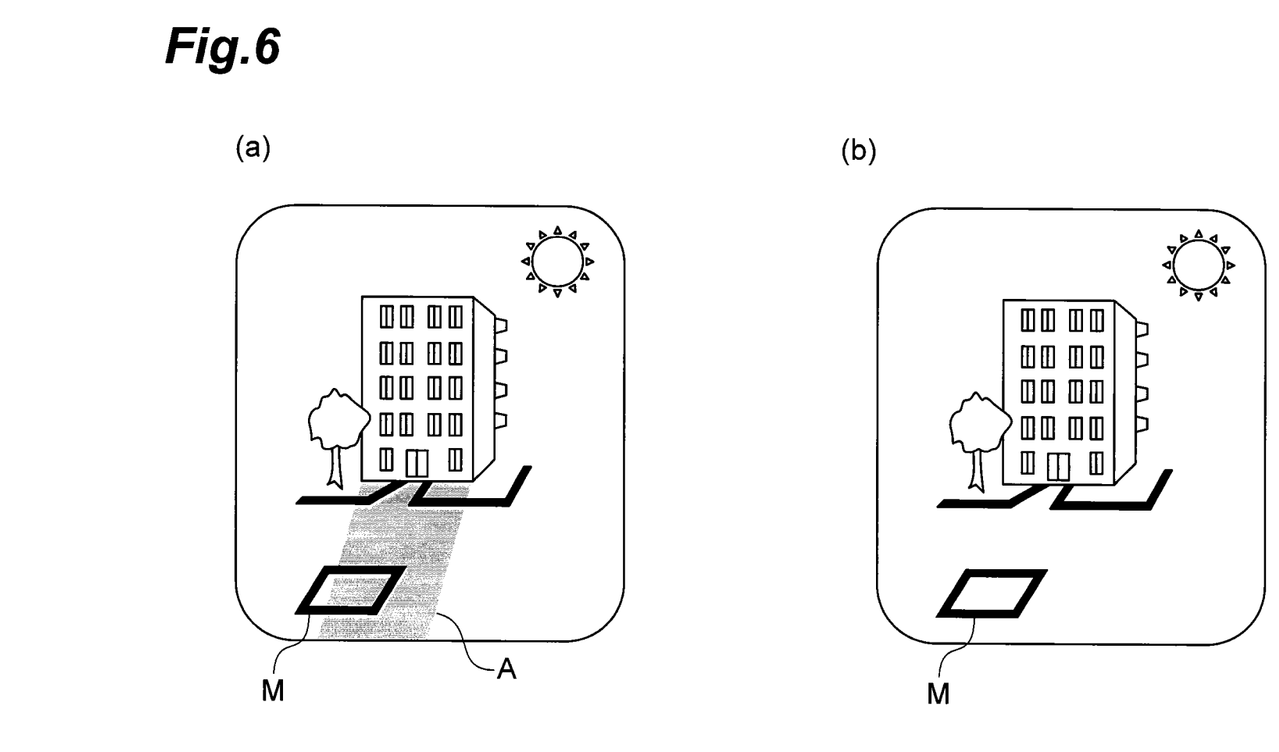
FIG. 6 is a diagram showing an example of correction processing by an image processing unit.

The image processing unit 19 is a unit that corrects at least one of the image in real space acquired by the image acquisition unit 15 and the marker stored in the object information storage unit 17, based on the shade information acquired by the shade computation unit 14, so as to enable extraction of a marker free from the effects of a shadow. The correction processing in the case where the image in real space is corrected is specifically described with reference to FIG. 6. FIG. 6 is a diagram for explaining an example of the correction processing by the image processing unit 19.

The image processing unit 19 performs correction of removing the color tone component of a shadow from the image in real space acquired by the image acquisition unit 15, based on the shade information. Specifically, the image processing unit 19 acquires information about the appearance position and color tone of the shadow in the image in real space based on the shade information from the shade computation unit 14, together with the image in real space, from the image matching unit 18. FIG. 6(*a*) is a diagram showing an example of the image in real space acquired here. As shown in FIG. 6(*a*), the image in real space includes a marker M and a shadow A. The image processing unit 19 then performs correction of removing the color tone component of the shadow from the image in real space acquired through the image matching unit 18, based on the information about the appearance position and color tone of the shadow. FIG. 6(*b*) is a diagram showing an example of the corrected image in real space. Specifically, the image processing unit 19, which has information about the appearance position and color tone of the shadow, can generate an image as shown in FIG. 6(*b*) by performing correction of removing the color tone component of the shadow from the image shown in FIG. 6(*a*), based on this information.

The image processing unit 19 may perform correction of removing the color tone component of the shadow from a region in the image in real space that has the approximately same color tone information as the color tone information of the shadow acquired from the image matching unit 18. This correction can remove not only the shadow caused by a structure permanently existing in real space but also the shadow created by a person or a substance temporarily passing through in real space. The image processing unit 19 sends the corrected image in real space to the marker sensing unit 20.

The marker sensing unit 20 is a unit that senses a marker from the image in real space acquired from the image processing unit 19. Specifically, the marker sensing unit 20 can acquire the marker data included in the object information from the object information storage unit 17, search the image in real space based on the acquired marker data, and output information such as the position and size of the maker in the image in real space, as a sensing result. The marker sensing unit 20 can detect the marker through search based on the marker data stored in the object information storage unit 17 because the shadow is removed from the image in real space acquired from the image processing unit 19.

The marker sensing unit 20 acquires the object data associated with the sensed marker from the object information storage unit 17 and sends the result of sensing the marker, together with the object data and the image in real space, to the object display computation unit 21.

The object display computation unit 21 is a unit that computes the orientation and size of the virtual object to be displayed in association with the marker, based on the result of sensing the marker. The object display computation unit 21 sends the computation result, together with the image in real space and the object data, to the display unit 22.

The display unit 22 is a unit that displays an overlaid image in which the image of the virtual object that is associated with the marker, detected by the marker sensing unit 20, in the object information storage means is overlaid on the image in real space.

Figure 7:
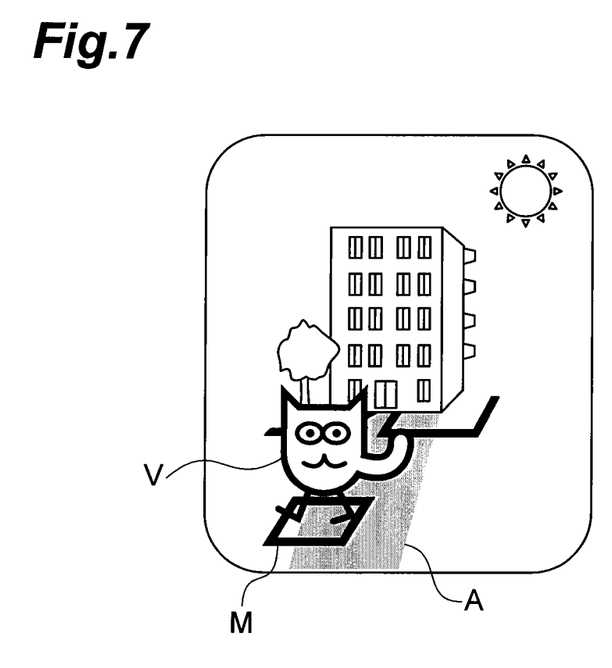
FIG. 7 is a diagram showing an example of an overlaid image output and displayed by a display unit.

Specifically, the display unit 22 generates an overlaid image as follows: the size and orientation of the virtual object are determined based on the computation result from the object display computation unit 21; and the image of the virtual object is overlaid on the image in real space. The overlay position of the virtual object is defined by the relative position with respect to the position of the marker. The display unit 22 then outputs the overlaid image to, for example, a device such as a display. FIG. 7 is a diagram showing an example of the overlaid image output and displayed by the display unit 22. In the example shown in FIG. 7, a virtual object V associated with a marker having a marker ID "1" in the object information shown in FIG. 5 is displayed in association with the marker M.

Figure 8:
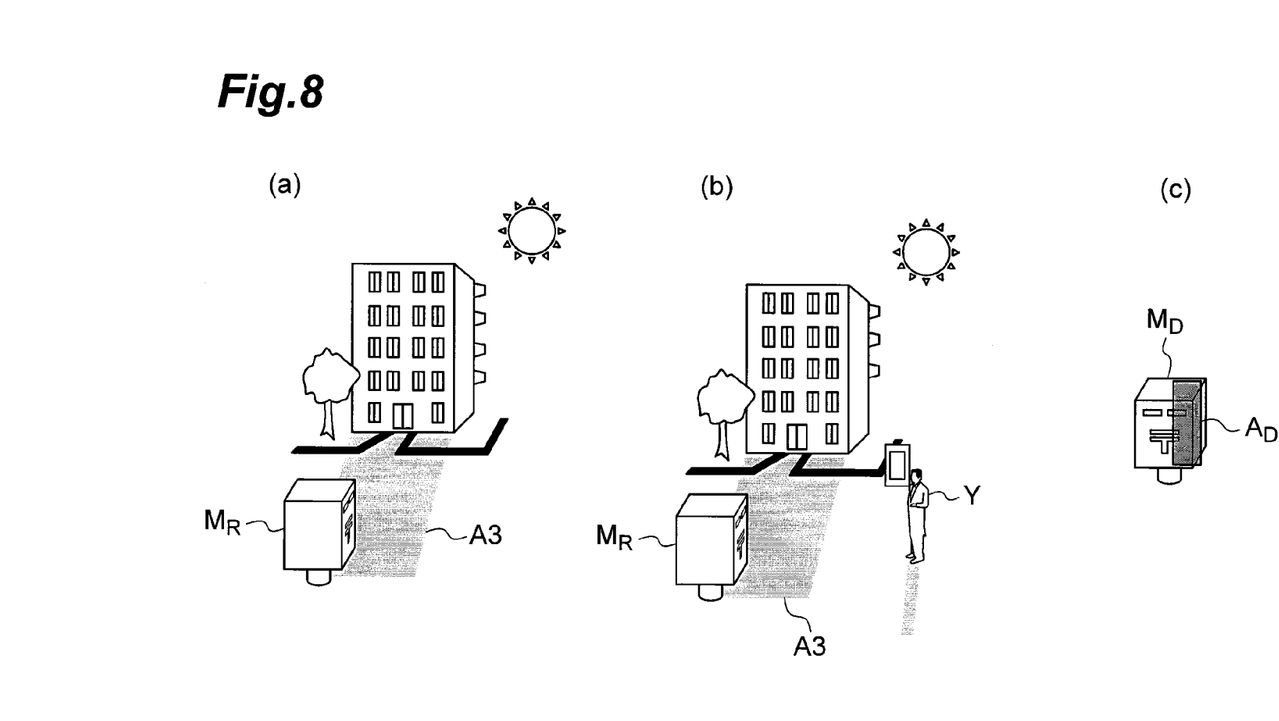
FIG. 8 is a diagram showing another example of correction processing by the image processing unit.

The image processing unit 19 may enable extraction of a marker free from the effects of a shadow by performing correction of adding the color tone of a shadow to the marker stored in the object information storage unit 17 based on the shade information acquired by the shade acquisition means. This correction processing is specifically described with reference to FIG. 8. FIG. 8 is a diagram for explaining an example of the correction processing by the image processing unit 19.

The image processing unit 19 performs correction of adding the color tone component of a shadow to the marker stored in the object information storage unit 17, in accordance with the location of the marker. Specifically, the image processing unit 19 acquires the information about the appearance position and color tone of the shadow in the image in real space based on the shade information from the shade computation unit 14, together with the image in real space, from the image matching unit 18. The image processing unit 19 also acquires the position information indicating the location of the marker from the object information storage unit 17. Based on these pieces of information, the image processing unit 19 estimates the positional relationship between the appearance position of the shadow in the image in real space and the position of the marker. FIG. 8(a) is a diagram schematically showing the positional relationship between the appearance position of a shadow A3 estimated by the image processing unit and the position of a marker $M_R$. The marker $M_R$ is stored as a marker ID "2" in the object information storage unit 17 in FIG. 5. The marker $M_R$ having the marker ID "2" has position information (XX, YY), so that the image processing unit 19 can arrange the marker $M_R$ in the estimated image in real space that is estimated by the image matching unit 18.

The image processing unit 19 can estimate a shadow that appears on the marker in the image in real space, based on the appearance position of the shadow and the position of the marker. More specifically, the image processing unit 19 estimates a region where a shadow appears on the marker arranged in real space, and adds the color tone component of the shadow to the appearance region of the shadow in the marker data acquired from the object information storage unit 17. FIG. 8(b) is a diagram showing the positional relationship between the shadow A3, the marker $M_R$, and the user Y, and FIG. 8(c) is a diagram schematically showing an example of marker data $M_D$ generated by the image processing unit 19 in the positional relationship shown in FIG. 8(b). As shown in FIG. 8(c), the image processing unit 19 can add the color tone component of a shadow to a region $A_D$ on the right side of the marker data $M_D$.

The image processing unit 19 sends the marker data with the color tone component of a shadow added thereto, together with the image in real space, to the marker sensing unit 20. The marker sensing unit 20 then senses the marker from the image in real space based on the marker data with the color tone component of a shadow added by the image processing unit 19. In this manner, even when a shadow is created by, for example, another structure, on the marker arranged in the image in real space, the image processing unit 19 can generate marker data in which the state of the shadow is reflected, and the marker sensing unit 20 can extract the marker from the image in real space based on the marker data.

Figure 9:
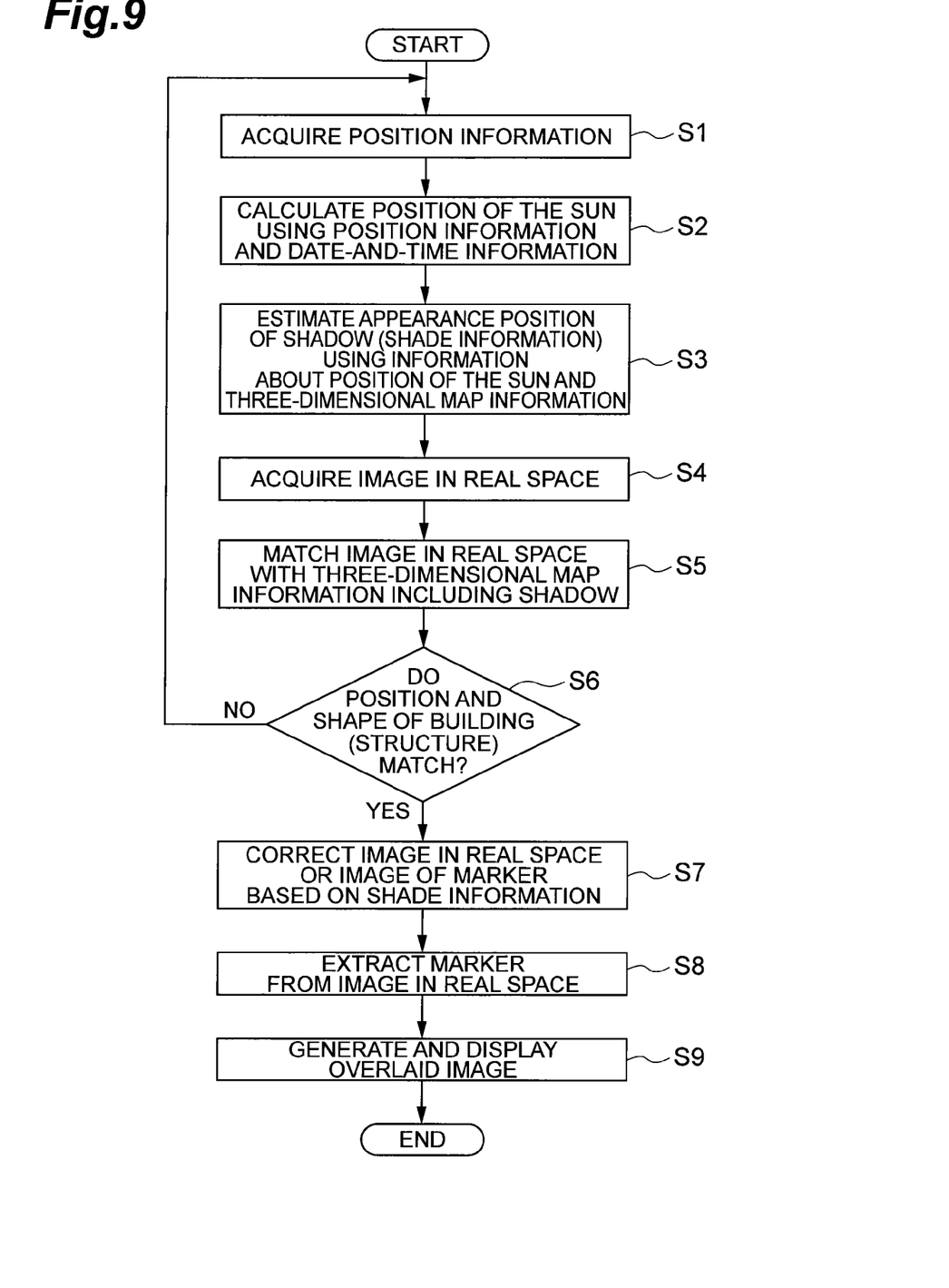
FIG. 9 is a flowchart showing processing of an object display method.

The processing of an object display method in the object display device 1 will now be described. FIG. 9 is a flowchart showing processing of the object display method.

First, the position information acquisition unit 11 acquires position information indicating the location of the object display device 1 (S1). The shade computation unit 14 then calculates the position of the sun at present, based on the date-and-time information managed by the date-and-time information management unit 12 and the position information. The shade computation unit 14 then acquires the three-dimensional map information around the location of the object display device 1 and estimates the appearance position of a shadow (shade information) in the image in real space, based on the position of the sun that is calculated in step S2 (S3).

The image acquisition unit 15 then acquires an image in real space (S4). The image matching unit 18 then generates an estimated image based on the map information and the shade information. The image matching unit 18 then matches the generated, estimated image with the image in real space acquired by the image acquisition unit 15 (S5). Here, the image matching unit 18 determines whether the estimated image and the image in real space match in the position and shape of, for example, a building (structure) (S6). If it is determined that they match, the process procedure proceeds to step S7. If it is not determined that they match, the process procedure returns to step S1.

In step S7, the image processing unit 19 corrects the image in real space acquired by the image acquisition unit 15 or the image of the marker stored in the object information storage unit 17, based on the shade information (S7). Specifically, the image processing unit 19 removes the color tone component of the shadow from the region where the shadow appears in the image in real space. In this case, the image processing unit 19 may perform correction of removing the color tone component of a shadow from a region of the image in real space that has the approximately same color tone as the color tone information of the shadow in the shade information. Alternatively, when it is estimated that there is a region covered with a shadow in the marker existing in real space, the image processing unit 19 adds the color tone component of the shadow to that region of the marker data.

The marker sensing unit 20 then senses and extracts the marker from the image in real space using the image in real space and the marker data at least one of which is corrected in step S7 (S8). The object display computation unit 21 computes the orientation and size of the virtual object to be displayed in association with the marker, based on the result of sensing the marker. The display unit 22 generates and displays an overlaid image in which the virtual object is overlaid at a predetermined position in the image in real space, based on the orientation and size of the virtual object displayed in association with the marker that is calculated based on the result of sensing the marker (S9).

Figure 10:
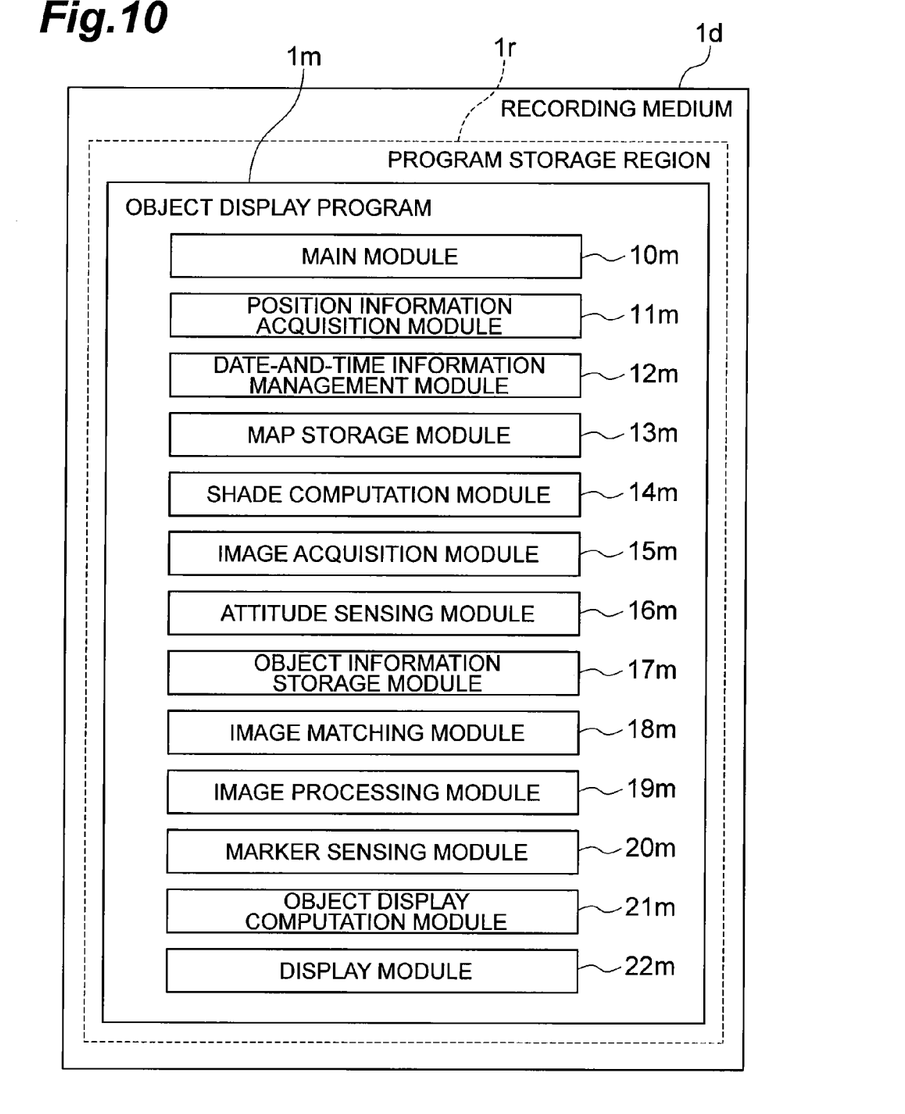
FIG. 10 is a diagram showing a configuration of an object display program.

An object display program that allows a computer to function as the object display device 1 in the present embodiment will now be described. FIG. 10 is a diagram showing a configuration of the object display program 1m corresponding to the object display device 1 shown in FIG. 1.

The object display program 1m includes a main module 10m centrally controlling the object display process, a position information acquisition module 11m, a date-and-time information management module 12m, a map storage module 13m, a shade computation module 14m, an image acquisition module 15m, an attitude sensing module 16m, an object information storage module 17m, an image matching module 18m, an image processing module 19m, a marker sensing module 20m, an object display computation module 21m, and a display module 22m. The modules 10m to 22m implement the respective functions for the functional units 11 to 22 in the object display device 1. The object display program 1m may be transmitted through a transmission medium such as a communication line or may be stored in a program storage region 1r of a recording medium 1d as shown in FIG. 10.

In the object display device 1, the object display method, and the object display program 1m in the present embodiment, shade information indicating the appearance position of a shadow in real space is acquired, and an image in real space or an image of a marker stored in advance is corrected so as to eliminate the effects of a shadow, based on the acquired shade information. Accordingly, marker detection processing can be performed in a similar manner as in an image in real space in which a shadow is not created. As a result, a marker can be detected from an image in real space in which a shadow is created.

The present invention has been described in details above based on an embodiment thereof. However, the present invention is not limited to the foregoing embodiment. The present invention is susceptible to various modifications in a range that does not deviate from the spirit of the invention.

INDUSTRIAL APPLICABILITY

The present embodiment provides an object display device capable of detecting a marker even when a shadow appears in an image in real space, in AR technology.

REFERENCE SIGNS LIST

1 ... object display device, 1m ... object display program, 1d ... recording medium, 10m ... main module, 11 ... position information acquisition unit, 11m ... position information acquisition module, 12 ... date-and-time information management unit, 12m ... date-and-time information management module, 13 ... map storage unit, 13m ... map storage module, 14 ... shade computation unit, 14m ... shade computation module, 15 ... image acquisition unit, 15m ... image acquisition module, 16 ... attitude sensing unit, 16m ... attitude sensing module, 17 ... object information storage unit, 17m ... object information storage module, 18 ... image matching unit, 18m ... image matching module, 19 ... image processing unit, 19m ... image processing module, 20 ... marker sensing unit, 20m ... marker sensing module, 21 ... object display computation unit, 21m ... object display computation module, 22 ... display unit, 22m ... display module.

The invention claimed is:

1. An object display device that includes an object information storage memory configured to store virtual object information about a virtual object in association with a marker that is a predetermined sign located in real space, extracts the marker from an image in real space, and overlays and displays a virtual object associated with the extracted marker on the image in real space, the object display device comprising:
an image acquisition device configured to acquire an image in real space; and
circuitry configured to
acquire shade information indicating an appearance position of a shadow in real space at present;
correct at least one of the acquired image in real space and the marker stored in the object information storage memory, based on the acquired shade information, so as to enable extraction of a marker free from effects of a shadow;
extract the marker from the image in real space using the image in real space and the marker at least one of which is corrected; and
a display configured to display an overlaid image in which an image of the virtual object associated with the marker in the object information storage memory is overlaid on the image in real space,
wherein the circuitry performs correction of the marker stored in the object information storage memory by adding a color tone component of a shadow to the marker stored in the object information storage memory, in accordance with a location of the marker, based on the acquired shade information, and
the circuitry extracts the corrected marker from the acquired image in real space.

2. The object display device according to claim 1, wherein the circuitry performs correction of removing a color tone component of a shadow from the acquired image in real space, based on the acquired shade information, and
the circuitry extracts the marker from the corrected image in real space.

3. The object display device according to claim 2, wherein the circuitry acquires color tone information of an appearance position of a shadow indicated by the shade information, from the image in real space, and performs correction of removing a color tone component of a shadow from a region having the approximately same color tone information as the color tone information in the image in real space.

4. The object display device according to claim 1, wherein the circuitry estimates the shade information based on three-dimensional map information including information representing a three-dimensional shape and position of a structure in real space, and date-and-time information representing the present date and time.

5. The object display device according to claim 4, wherein the circuitry estimates an appearance position of a shadow created by a user of the object display device, based on the position information indicating a location of the object display device and date-and-time information representing the present date and time, and includes the estimated position into the shade information.

6. An object display method performed in an object display device that includes an object information storage memory configured to store virtual object information about a virtual object in association with a marker that is a predetermined sign located in real space, extracts the marker from an image in real space, and overlays and displays a virtual object associated with the extracted marker on the image in real space, the object display method comprising:
an image acquisition step of acquiring an image in real space;
a shade acquisition step of acquiring shade information indicating an appearance position of a shadow in real space at present;
an image processing step of correcting at least one of the image in real space acquired in the image acquisition step and the marker stored in the object information storage memory, based on the shade information acquired in the shade acquisition step, so as to enable extraction of a marker free from effects of a shadow;
a sensing step of extracting the marker from the image in real space using the image in real space and the marker at least one of which is corrected in the image processing step; and
a display step of displaying an overlaid image in which an image of the virtual object associated with the marker, detected in the sensing step, in the object information storage memory is overlaid on the image in real space,
wherein the method further includes performing correction of the marker stored in the object information storage memory by adding a color tone component of a shadow to the marker stored in the object information storage memory, in accordance with a location of the marker, based on the acquired shade information, and
extracting the corrected marker from the acquired image in real space.

7. A non-transitory computer readable medium storing an object display program which when executed by an object display device that includes an object information storage memory configured to store virtual object information about a virtual object in association with a marker that is a predetermined sign located in real space, extracts the marker from an image in real space, and overlays and displays a virtual object associated with the extracted marker on the image in real space, causes the object display device to perform a method comprising:

- an image acquisition step of acquiring an image in real space;
- a shade acquisition step of acquiring shade information indicating an appearance position of a shadow in real space at present;
- an image processing step of correcting at least one of the image in real space acquired in the image acquisition step and the marker stored in the object information storage memory, based on the shade information acquired in the shade acquisition step, so as to enable extraction of a marker free from effects of a shadow;
- a sensing step of extracting the marker from the image in real space using the image in real space and the marker at least one of which is corrected in the image processing step; and
- a display step of displaying an overlaid image in which an image of the virtual object associated with the marker, detected in the sensing step, in the object information storage memory is overlaid on the image in real space, wherein the method further includes performing correction of the marker stored in the object information storage memory by adding a color tone component of a shadow to the marker stored in the object information storage memory, in accordance with a location of the marker, based on the acquired shade information, and extracting the corrected marker from the acquired image in real space.

* * * * *